United States Patent Office 3,475,907
Patented Nov. 4, 1969

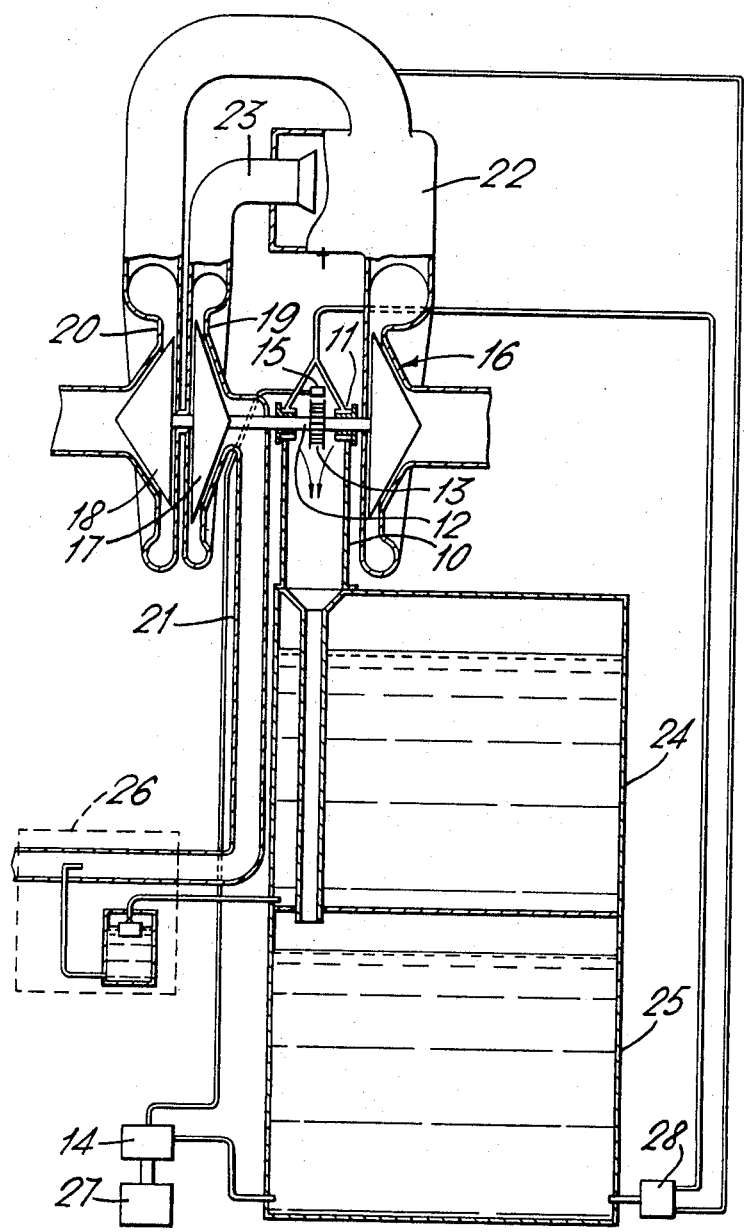

3,475,907
GAS TURBINE WITH LUBRICANT AND FUEL
SUPPLY SYSTEMS THEREFOR
Eric Kellett, London, England, assignor to C.A.V. Limited,
London, England, a British company
Filed Apr. 12, 1968, Ser. No. 720,942
Claims priority, application Great Britain, Apr. 27, 1967,
19,441/67
Int. Cl. F02g 3/00; F04d 17/08
U.S. Cl. 60—39.08                                  5 Claims

ABSTRACT OF THE DISCLOSURE

A hot gas generator comprising a body part which defines a support for a rotary shaft carrying a rotor of a turbine and the rotors of compressors, the body part being mounted on a fuel tank which in turn is mounted on a fluid reservoir motor means being provided to effect rotation of the shaft by means of fluid under pressure derived from a pump 14 driven by a motor the pump deriving fluid from the fluid reservoir.

---

The invention relates to generators for producing heated gas and has for its object to provide such a generator in a simple and convenient form.

According to the invention a generator for producing heated gas comprises in combination, a body part in which is mounted a rotary shaft, a turbine rotor mounted at one end of the shaft, the turbine being driven in use, by heated gases leaving a combustion chamber, first and second compressor rotors mounted upon the other end of the shaft for supplying primary air and dilution fluid to the combustion chamber respectively, a carburetor for mixing fuel with the primary air flowing to the combustion chamber, a fuel tank upon which the body part is mounted, said carburetor being positioned below the level of the fuel tank so that fuel can flow to the carburetor under the action of gravity, a fluid motor for driving said shaft for starting purposes, and an outlet for the motive fluid from the lower side of the body part, said outlet extending through the fuel tank to a reservoir.

The accompanying drawing shows in diagrammatic form one example of a hot gas generator in accordance with the invention and in which there is provided a hollow body part 10 in which is mounted a rotary shaft 12 which extends from the ends of the body part. Conveniently the shaft is supported by a pair of spaced journal bearings 11 which also incorporate thrust bearings to cater for any axial loads imposed upon the shaft. For starting the generator as will be described, the shaft is driven by a fluid pressure motor and conveniently this is the form of a Pelton wheel 13 mounted intermediate the bearings and within the body part. Also provided and having an external connection to a source 14 of motive fluid is a nozzle 15 which is arranged to direct the motive fluid at the buckets of the Pelton wheel. The lower part of the body part defines an outlet for the motive fluid and conveniently the outlet is in the form of a hollow pedestal.

At one end of the body part is mounted a turbine 16 including a casing within which and mounted on the shaft is a turbine rotor. The outlet is flanged for connection to a conduit for conveying the heated gases if this is required.

Mounted on the opposite end of the shaft are a pair of centrifugal compressor rotors 17, 18 each having radially extending blades. The rotors are mounted in back to back relationship and the rotor 17 will hereinafter be referred to as the first rotor, the rotor 18 being hereinafter referred to as the second rotor. The diameter of the rotor 17 is slightly larger than that of the rotor 18 but the axial length of its blades is smaller than the axial length of the blades of the rotor 18. The reason for the differing dimensions will be explained later in the specification. Furthermore, surrounding these rotors are first and second compressor casings 19, 20 respectively the casings being secured to the body part of the generator. The inlet 21 to the first casing extends downwardly to a level below that of the pedestal whilst the inlet to the second casing extends axially away from the generator. The outlets of both the casings extend outwardly and upwardly.

Mounted on the outlets of the compressor casings and the inlet of the turbine casing is a combustion chamber 22. In the combustion chamber there is mounted a burner 23 which is supplied with a stoichiometric air fuel mixture from the outlet of the first compressor casing. At intervals along the length of the combustion chamber inlets (not shown) are provided for dilution air which is directed thereto from the outlet of the second compressor casing. The combustion chamber outlet is connected to the inlet of the turbine casing and at a point downstream from the burner, there is provided an electrical ignitor (not shown) of any convenient type.

The body part is supported by means of the pedestal, upon a fuel tank 24 whilst this in turn, is mounted upon a fluid reservoir 25. The fuel tank is provided with a conduit extending from the fluid outlet in the pedestal to the reservoir. Furthermore, the inlet 21 to the first compressor casing has mounted thereon a carburetor 26 which lies below the fuel tank so that fuel can flow to the carburetor under the action of gravity.

In order to start the generator fluid under pressure is supplied to the nozzle 15 of the Pelton wheel to cause rotation of the shaft together with the compressor rotors. When a predetermined speed has been attained as indicated by any convienient means such as a pressure gauge which registers the pressure of air delivered by the second compressor, the fuel supply to the carburetor is turned on and the ignitor is energised. The stoichiometric air fuel mixture supplied to the burner 23 is ignited by the ignitor and the heated gases leaving the combustion chamber drive the turbine which in turn, drives the compressors. Once combustion has started the supply of fluid to the Pelton wheel can be cut off. This supply of fluid is from an oil pump 14 which is driven by an electric motor 27 from a storage accummulator, the pump drawing fluid from the reservoir. By ensuring that the fluid leaving the Pelton wheel has a fairly long path to travel before it reaches the reservoir the risk of frothing of the fluid is minimised. Moreover, the supply of fluid to the Pelton wheel ensures that the journal bearings are lubricated as soon as the shaft rotates and continued lubrication of the bearings is provided by a pneumatically operated oil pump 28 which derives its motive fluid from the second compressor.

In order to control the quantity of heated gas produced by the generator the fuel flowing through the carburetor can be varied. It is arranged that when maximum fuel is being supplied the safe speed of rotation of the shaft will not be exceeded. Furthermore, the ratio of the volume of air to air fuel mixture delivered by the first and second compressors is such that at the maximum fuel flow the temperature of the gases entering the turbine casing will not exceed the safe temperature of operation of the turbine. This temperature is controlled by the quantity of dilution air which is supplied to the combustion chamber. The first compressor whilst it delivers a smaller volume of air/fuel mixture than the volume of air delivered by the second compressor, has a higher output pressure to ensure that the air/fuel mixture penetrates into the combustion chamber. Moreover, the burner is provided with a flame trap to minimise the risk of blow back and a pressurised valve may be provided at the outlet of the first compressor such that in the event of a back fire the higher pressure will lift the valve.

In an alternative arrangement (not shown) the first and second compressor rotors are replaced by a single rotor with the blades mounted on its opposite sides. Furthermore an electric motor may be provided on the shaft for starting purposes instead of a fluid motor.

In order to stop the generator it is merely necessary to turn off the supply of fuel or for emergency use a valve may be provided intermediate the outlet of the first compressor and the burner to cut off the supply of air fuel mixture to the burner.

Having thus described my invention what I claim as new and desire to secure by Letters Patent is:

1. A generator for producing heated gases and comprising in combination, a body part carrying bearings in which is mounted a rotary shaft, a turbine rotor mounted at one end of the shaft, the turbine being driven in use, by heated gases leaving a combustion chamber, first and second compressor rotors mounted upon the other end of the shaft for supplying primary air and dilution fluid to the combustion chamber respectively, a carburetor for mixing fuel with the primary air flowing to the combustion chamber, a fuel tank upon which the body part is mounted, said carburetor being positioned below the level of the fuel tank so that fuel can flow to the carburetor under the action of gravity, a fluid motor for driving said shaft for starting purposes, a motive fluid outlet for said fluid motor positioned in the lower side of the body part for receiving fluid from said motor, said outlet extending through the fuel tank to a reservoir.

2. A generator as claimed in claim 1 in which the rotary part of said fluid motor is mounted on said shaft and is positioned within the body part intermediate the compressors rotors and the turbine rotor.

3. A generator as claimed in claim 2 in which said motor is a Pelton wheel having a nozzle for the motive fluid mounted in the body part.

4. A generator as claimed in claim 3 in which said motive fluid acts to lubricate said bearings whilst the generator is being started, means being provided to supply lubricating fluid to said bearings during normal operation of the generator.

5. A generator as claimed in claim 4 in which said means comprises a pneumatically operated oil pump driven by air supplied by the second compressor.

References Cited

UNITED STATES PATENTS

| 2,469,679 | 5/1949 | Wyman | 60—39.14 XR |
| 2,595,505 | 5/1952 | Bachle | 60—39.65 XR |
| 2,604,188 | 7/1952 | Marchant. | |
| 2,612,020 | 9/1952 | Griffith. | |
| 2,711,071 | 6/1955 | Frankel | 60—39.08 XR |
| 2,754,657 | 7/1956 | Ehorn | 60—39.14 |
| 2,970,437 | 2/1961 | Anderson | 60—39.08 XR |

FOREIGN PATENTS 626,174   7/1949   Great Britain.

CARLTON R. CROYLE, Primary Examiner

A. D. HERRMANN, Assistant Examiner

U.S. Cl. X.R.

60—39.14, 39.65, 39.74; 184—6; 230—128